United States Patent Office 3,227,852
Patented Jan. 4, 1966

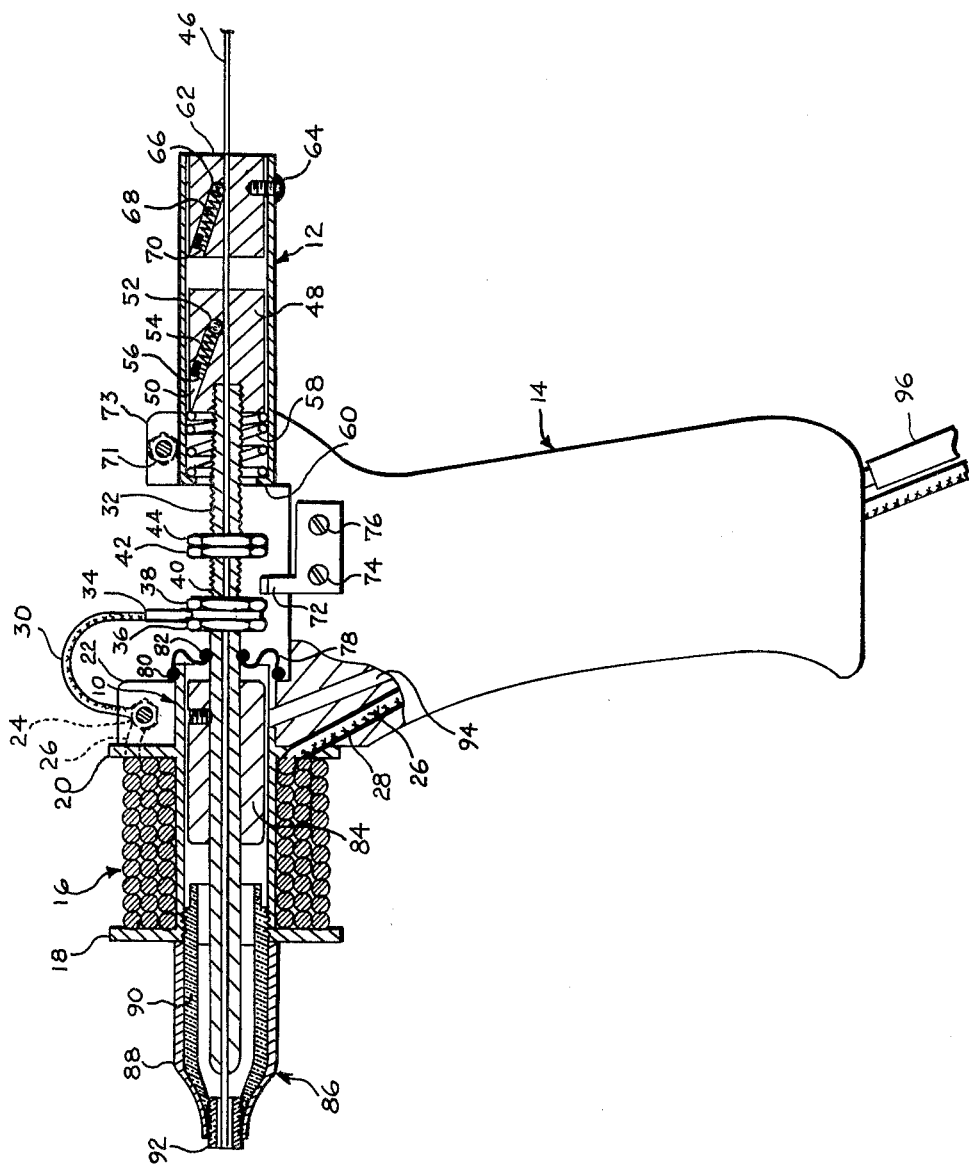
JOHN R. FULLERTON
LAURENCE E. LEECH
*INVENTOR.*
BY EARL F. KOTTS

3,227,852
WELDING APPARATUS WITH MAGNETIC WIRE FEED
John R. Fullerton and Laurence E. Leech, San Diego, Calif., assignors to The Ryan Aeronautical Co., San Diego, Calif.
Filed July 22, 1963, Ser. No. 296,548
6 Claims. (Cl. 219—130)

The present invention relates to a magnetically operated wire feeding device which is particularly useful for feeding wire type filler material to a welding arc created by an impulse of high electrical energy.

It is an object of the present invention to provide a simple and compact device for feeding wire type filler material to a welding arc, which device is operated by an impulse of high electrical energy, said impulse also being used to supply the welding energy.

It is another object of the present invention, to provide such a device which is an integral part of a welding gun.

It is a further object of the present invention, to provide a welding gun for use in inert gas arc welding, which gun is simple in construction and effective in use, and which automatically feeds filler wire during the welding operation.

In the drawings:

The single figure is a side elevation, partly in section, showing an inert gas arc welding gun embodying the present invention.

The welding gun and feed mechanism of the present invention are adapted for use in any welding system and apparatus wherein a rapid current impulse of substantial magnitude is supplied to the welding electrode to accomplish a spot weld.

Referring to the drawing, there is illustrated a welding gun which includes a spool 10, a receiver 12, and a handle 14. A coil 16 of wire 26 is wound on the spool 10 between the end flanges 18 and 20 formed on the spool 10. The spool 10 is held in place on the handle 14 by upwardly extending laterally spaced lugs 22 on the handle 14 which are brought together by a bolt and nut assembly 24. One end of wire 26 extends from the coil 16 down through passage 28 in handle 14 and to the source of electrical energy (not shown). The handle 14 is formed of a material which is an electrical insulator. The other end of the wire 26 extends from coil 16 to the bolt and nut assembly 24. A wire 30 flexibly connects the wire 26 to the copper plunger 32. A terminal piece 34 is connected on the end of wire 30 and is held between lock nuts 36 and 38 which are engaged with the threads 40 on the plunger 32. Lock nuts 42 and 44 are also threaded onto the plunger 32. The plunger 32 has a central opening therethrough which accommodates the filler wire 46. The rear end of the plunger 32 is screwed into a movable chuck 48. The movable chuck 48 has a central opening which accommodates the filler wire 46. An angular passage 50 is formed in the movable chuck 48. A ball 52 is seated in the lower end of the passage, and a coil spring 54 is positioned against the ball. A screw 56 is threaded into the passage 50 to hold the spring against the ball. A coil spring 58 is located between the forward end of the movable chuck 48 and a shoulder 60 formed on the forward end of the receiver 12.

A fixed chuck 62 is located adjacent the rear end of receiver 12 and is held in place by set screw 64. This chuck has a ball check in it similar to the one in the movable chuck 48 and includes the ball 66, spring 68, and screw 70. A bolt and nut assembly 71 extends between laterally spaced lugs 73 and holds the receiver 12 in position on handle 14.

A stop finger 72 is affixed to the handle 14 by the screws 74 and 76, and the nuts 38 and 42 act as stops in cooperation with the stop finger 72.

The rear end of spool 10 is sealed by a flexible diaphragm 78 which is held in place on the spool 10 and plunger 32 by the O-rings 80 and 82.

An iron core 84 is fixed to the plunger 32. Any material which reacts to a magnetic field can be used for the core. A welding cup 86 is screwed into the forward end of spool 10. This cup is formed of an outer shell 88 overlying a ceramic inner shell 90. A glass tip 92 is screwed into the end of welding cup 86.

A gas tube 94 extends from the bottom of handle 14, up through the handle to the hollow interior of spool 10. A gas line 96 is affixed to the bottom end of gas tube 94 and communicates with a source of inert gas (not shown).

*Operation*

A flow of inert gas, such as argon or helium, is fed through the gas line 96 and gas tube 94 to the interior of the hollow spool 10. The diaphragm 78 and O-rings 80 and 82 seal the back end of the spool and prevent the gas from leaking. The gas flows around core 84, through the hollow interior of welding cup 86, and out the central opening in tip 92 to the immediate area between tip and workpiece.

An arc is created along an ionized path in the inert gas stream. This is accomplished by placing the end of the welding tip 92 near the grounded workpiece and applying a high frequency, high voltage, low amperage electrical current through the wire 26, coil 16, flexible conductor 30, to the copper plunger 32 and the filler wire 46. The arc is created in the inert gas stream between the end of the filler wire 46 and the grounded workpiece (not shown).

Next, a relatively low voltage, high current impulse of electrical energy is impressed on the wire 26, and it also travels the circuit through coil 16, flexible conductor 30, copper plunger 32, and filler wire 46. This energy travels the arc from the tip of the filler wire 46 to the grounded workpiece.

The energy impulse not only provides energy to accomplish the weld—it also actuates the feeding mechanism for the filler wire 46.

The feeding of the filler wire 46 into the arc area is caused by the magnetic lines of force from the coil 16, due to the current impulse, acting upon the iron core 84.

The magnetic force field moves the iron core 84 forward. Since the core is fixed to the plunger 32, the plunger also moves forward. The plunger 32 is attached to the movable chuck 48 and exerts a forward force on the movable chuck against spring 58. The spring-loaded ball 52 grips the filler wire 46 and moves it forward with movable chuck 48. Since the chuck 62 is fixed to the receiver 12, the filler wire 46 feeds forward and moves ball 66 back against spring 68. The wire cannot move backward due to the spring-loaded balls 52 and 66. The nut 42 engages stop finger 72 to limit forward movement of the plunger 32.

When the impulse of welding current has decayed, the spring 58 acting against the forward end of movable chuck 48 moves the movable chuck backward along the filler wire 46 until stop 38 engages stop finger 72.

The amount of filler wire 46 which is fed to the welding area is determined by adjusting the stop nut 42 on the plunger 32.

The filler wire 46 is thus positively and automatically fed in efficient and controlled fashion.

Having thus described our invention, we claim:

1. A device for feeding filler wire to a welding arc, including:
    a coil connected to receive a pulse of welding current;
    a movable core of material which reacts to a magnetic force field adjacent said coil, said core carrying a plunger electrically conductively connected to one end of said coil and said plunger carrying a movable chuck constructed and arranged to receive and to move the filler wire in one direction;

a fixed chuck holding the filler wire against movement in the reverse direction;

the passage of welding current through said coil causing said core to react to the resulting magnetic field of said coil and move relative thereto, said movement adjusting the position of said plunger and the filler wire and feeding it to the welding arc.

2. A device for feeding filler wire to a welding arc, including:

a wire coil;

a plunger of electrically conductive material movable axially through said coil and constructed to accommodate passage of filler wire, one end of said coil wire being connected to the plunger and the other end being adapted for connection to receive a pulse of welding current; and a core of material which reacts to a magnetic force field affixed to said plunger adjacent said coil;

feeding means for feeding filler wire in one direction only through said plunger; said feeding means being carried by said plunger and actuated thereby;

the passage of welding current through said coil causing the core to react to the resulting magnetic field of said coil and move relative thereto, said movement adjusting the position of the filler wire and feeding it to the welding arc.

3. Inert gas arc welding apparatus including:

a hollow tube;

a gas passage communicating with the interior of said tube;

a coil surrounding said tube and adapted for connection to a source of electrical energy;

a plunger of electrically conductive material extending into said tube, said plunger having an opening therethrough to accommodate filler wire, and being in electrical contact with said coil;

a core of material which reacts to a magnetic force field fixed to said plunger within the tube adjacent the coil;

sealing means at the rear of said tube affixed to the plunger, said sealing means being flexible to accommodate movement of said plunger;

feeding means for feeding said filler wire through said plunger;

inert gas being provided through said gas passage, and arc starting and welding energy being provided through said coil to the tip of said filler wire, the welding energy creating a magnetic field adjacent said coil which moves said core and plunger to feed filler wire to the welding arc.

4. An inert gas arc welding gun for use with filler wire, comprising:

a handle;

a hollow tube on said handle at the forward end thereof;

a gas passage communicating with the interior of said tube;

a receiver at the rearward portion of said handle;

a coil surrounding said tube and adapted for connection to a source of electrical energy;

a plunger of electrically conductive material extending into said tube and said receiver, said plunger having an opening therethrough to accommodate filler wire, and being in electrical contact with said coil;

a core of material which reacts to a magnetic force field fixed to said plunger within the tube adjacent the coil;

sealing means at the rear of said tube affixed to the plunger, said sealing means being flexible to accommodate movement of said plunger;

feeding means in said receiver for feeding said filler wire;

stop means on said plunger and handle for limiting movement of said plunger to control the amount of filler wire which is fed to the welding arc;

inert gas being provided through said gas passage, and arc starting and welding energy being provided through said coil to the tip of said filler wire, the welding energy creating a magnetic field adjacent said coil which moves said core and plunger to feed filler wire to the welding arc.

5. A welding gun according to claim 4 wherein the positioning means includes:

a fixed chuck affixed to the receiver and including a ball check adapted to engage the filler wire;

a movable chuck affixed to said plunger and having a ball check adapted to engage the filler wire; and spring means engaging said movable chuck to position the chuck at its starting location.

6. A welding gun according to claim 4 wherein the stop means is adjustable so that a pre-selected amount of filler wire may be fed to the welding arc.

References Cited by the Examiner

UNITED STATES PATENTS

| | | | |
|---|---|---|---|
| 1,963,915 | 6/1934 | Kennedy et al. | 314—78 X |
| 2,761,955 | 9/1956 | Sholle | 219—127 |
| 2,866,081 | 12/1958 | Take | 219—130 |

FOREIGN PATENTS

| | | |
|---|---|---|
| 118,924 | 7/1958 | Russia. |

ANTHONY BARTIS, *Acting Primary Examiner.*

JOSEPH V. TRUHE, RICHARD M. WOOD, *Examiners.*